United States Patent [19]

Stroud et al.

[11] 4,330,715

[45] May 18, 1982

[54] AUTOMATIC FEEDBACK SYSTEM

[76] Inventors: Lebern W. Stroud, 1018 Briarcliff, Arlington, Tex. 76012; Jack E. Everett, 7216 Craig St., Ft. Worth, Tex. 76112

[21] Appl. No.: 121,989

[22] Filed: Feb. 15, 1980

[51] Int. Cl.³ ............................ H02P 9/02; H02P 9/14
[52] U.S. Cl. .................................. 307/10 R; 307/153; 219/133; 322/28
[58] Field of Search ..................... 307/22, 10 R, 38, 2, 307/26, 29, 109, 153; 219/133; 322/28

[56] References Cited

U.S. PATENT DOCUMENTS 3,770,976 11/1973 Stroud et al. ................. 307/10 R Primary Examiner—L. T. Hix
Assistant Examiner—S. D. Schreyer
Attorney, Agent, or Firm—Arthur F. Zobal

[57] ABSTRACT

A system adapted to be coupled to the alternator-rectifier system of a motor vehicle including a feedback capacitor coupled from the stator windings to the rotary coil for applying a pulsating DC output to the rotary coil when a welding load is applied to the output of the alternator-rectifier system. A DC power supply is employed normally to excite the rotary coil during no-load conditions.

9 Claims, 1 Drawing Figure

AUTOMATIC FEEDBACK SYSTEM

FIELD OF THE INVENTION

The present invention relates to an automatic feedback system for increasing the power and current from the electrical system of a motor vehicle for operating a load such as a welding system.

DESCRIPTION OF THE PRIOR ART

U.S. Pat. No. 3,770,976 discloses a portable welding system comprising a feedback system for operating a welder off of the alternator of a motor vehicle.

SUMMARY OF THE INVENTION

It is an object of the present invention to provide an automatic feedback system for operating a load off of a multi-phase rectified rotary field system and which feedback system operates on demand load with no mechanical switching. The multi-phase rectified rotary field system comprises a rotatable coil for forming the rotary field when excited and stationary windings having an output coupled thereto by way of rectifier means.

In the system of the present invention, a DC power supply normally excites the rotatable coil of the multi-phase system and output means is coupled to the output of the multi-phase system for applying current to a load. In addition, capacitor means is coupled to the stationary windings and to the rotatable coil for applying a pulsating DC output from the stationary windings to the rotatable coil when the coil draws current.

In a further aspect, circuit means is coupled from the DC power supply to the rotatable coil for normally exciting the rotatable coil. First output means is coupled to the output of the multi-phase system for applying current to a welding load. Second output means is coupled to the output of the multi-phase system for applying a power tool load to the output. Feedback circuitry is provided comprising a feedback capacitor means coupled from said stationary windings to said circuit means. Switch means is provided for coupling a power tool capacitor means from ground to a position between said feedback capacitor means and said stationary windings when the second output means is used to apply a power tool load to said output. Said switch means is capable of uncoupling said power tool capacitor means from ground to said position between said feedback capacitor means and said stationary windings. Said feedback circuitry comprising said feedback capacitor means applies a pulsating DC output from said stationary windings to said rotatable coil when a welding load is applied to said output and when said switch means is in a condition to uncouple said power tool capacitor means from ground to said position between said feedback capacitor means and said stationary windings.

DESCRIPTION OF THE PREFERRED EMBODIMENTS

Figure 1:
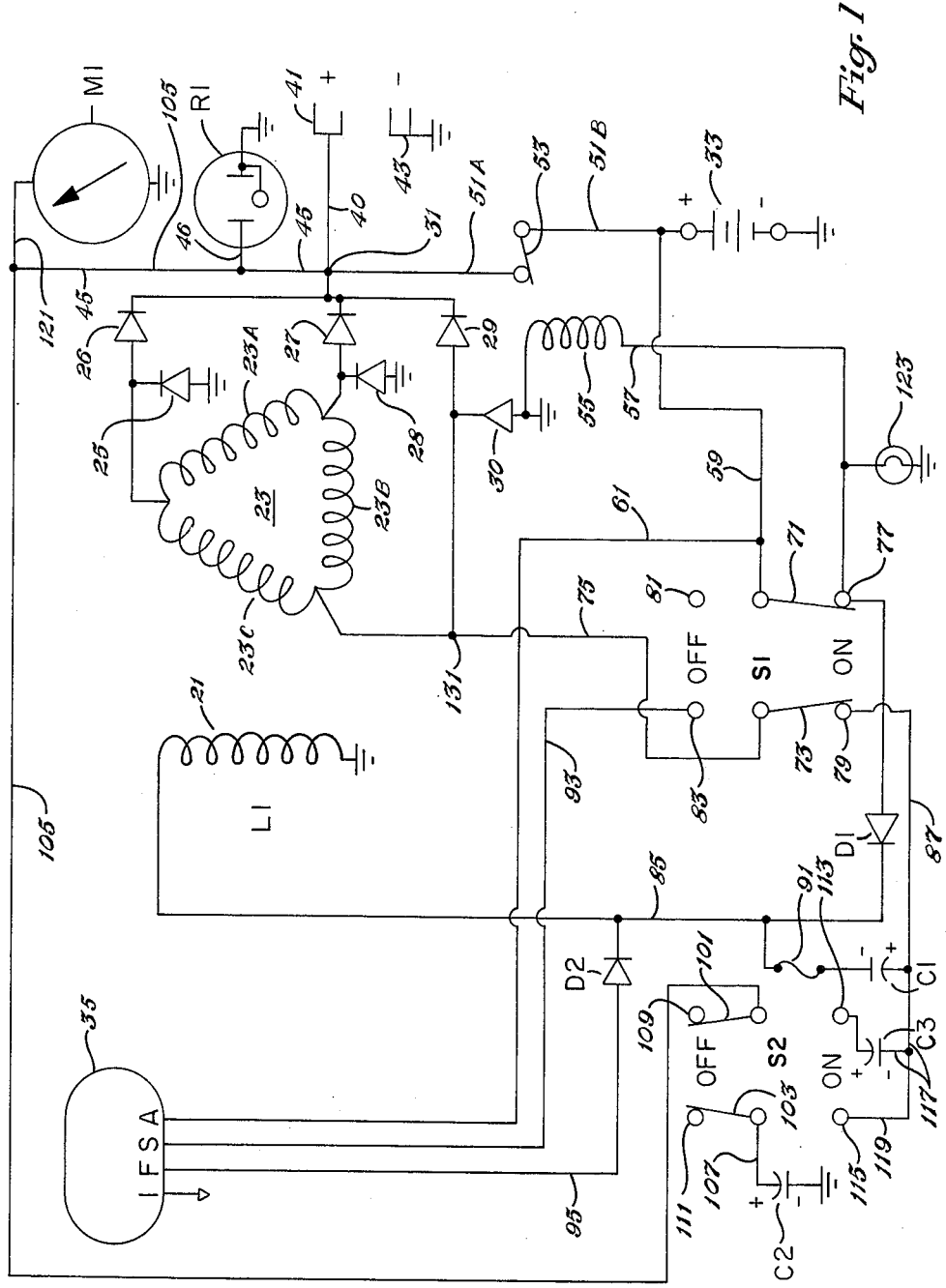
FIG. 1 schematically illustrates the electrical circuitry of the present invention.

Referring now to the drawing reference numerals 21 and 23 identify a rotor field coil and three phase stator windings (23A, 23B, 23C) of an alternator of a conventional automobile or truck. The rotor field coil 21 is rotated by the vehicle engine inside a stationary stator which comprises the three phase stator windings 23A, 23B, 23C. The phase windings 23A, 23B, and 23C are electrically 120 degrees apart and may be connected in a Delta configuration as shown or a Y configuration (not shown). Coupled to the stator windings are diode rectifiers 25–30. When the field coil 21 is excited electrically and rotated within the stator, alternating current will be induced in the three phase stator windings which will be rectified by the diodes whereby the output 31 of the three phase rectified system will be a pulsating voltage having a DC component. The frequency of the pulsating voltage will be dependent upon the rpm of the engine while the magnitude of the DC component will be dependent upon the engine rpm as well as the electrical input to the rotary field. In normal engine operation, the output at 31 is applied to charge a conventional 12 volt battery 33. Reference numeral 35 identifies a conventional regulator having terminals A, S, F, and I. In normal engine operation, the A terminal is connected to the output 31 of the alternator and to the battery 33. The regulator senses the voltage at the stator windings 23 by way of terminal S and if it increases beyond a certain level then the regulator reduces the input applied to the rotary field coil 21 by way of terminal F thereby reducing the out of the alternator-rectifier system. In the conventional motor vehicle employing a 12 volt battery, the regulator limits the output of the three phase rectifier system to not greater than 15 volts DC to prevent overcharging the battery.

The system of the present invention for allowing a welder or power tools to be operated off of the output of the alternator now will be described. Plug 41 coupled to output 31 by way of lead 40 and plug 43 coupled to ground are provided for allowing welding cables (not shown) to be coupled to the alternator output 31 and to ground to allow a welder to be operated off of the output 31. Electrical female receptacle R1 also is coupled to output 31 by way of leads 45 and 46 and to ground to allow power tools to be operated off of the output 31. The output 31 is coupled to the plus terminal of battery 33 by way of leads 51A, 51B and a normally closed relay switch 53 controlled by solenoid coil 55 which is coupled to ground and to lead 57. The plus terminal of battery 33 is coupled to the A terminal of regulator 35 by way of leads 59 and 61. A master switch S1 is provided having switch blades 71 and 73 coupled to leads 59 and 75 the latter of which is coupled to the juncture of phase windings 23B and 23C. Switch blades 71 and 73 are adapted to be moved together to an ON position to engage terminals 77 and 79 respectively as shown and to be moved together to an OFF position to engage terminals 81 and 83 respectively. Terminal 77 is coupled to lead 57 and to lead 85, the latter of which is connected to rotor field coil 21 by way of slip rings (not shown). Lead 85 also has a diode D1 coupled thereto. A feedback lead 87 is coupled to terminal 79 and to lead 85. Lead 87 includes feedback capacitor C1 and a fuse 91. Terminal 83 is coupled to lead 93 which in turn is coupled to the S terminal of the regulator 35. The F terminal of the regulator 35 is coupled to lead 85 by way of lead 95 and diode D2.

Also provided is a power tool switch S2 having switch blades 101 and 103 coupled to leads 105 and 107 respectively. Lead 105 is coupled back to lead 45 and to output 31 while lead 107 includes a capacitor C2 which is coupled to ground. Switch blades 101 and 103 are adapted to be moved together to an OFF position to engage terminals 109 and 111 respectively as shown and to an ON position to engage terminals 113 and 115 respectively. Terminal 113 is coupled to lead 117 which is coupled to lead 87. Lead 117 includes a capacitor C3. Terminal 115 is coupled to lead 119 which is coupled to lead 117 and hence to lead 87.

Also provided is a volt meter M1 coupled to the output 31 by way of leads 121, and 45 and a pilot light 123 coupled to lead 57.

For normal vehicle operations, switch blades 71 and 73 of switch S1 will be in their OFF positions. In addition, switch blades 101 and 103 of switch S2 will be in their OFF positions. Thus the output 31 of the alternator will be coupled to battery 33 by way of lead 51A, closed switch 53 and lead 51B and the S terminal of regulator 35 will be coupled to the stator windings by way of lead 93, switch blade 73 and lead 75. In this condition, the output 31 of the alternator will charge the battery and the regulator 35 will regulate the output of the alternator since its S terminal is coupled to the stator windings and its F terminal is coupled to the rotor field coil 21. The voltage at output 31 is a pulsating DC voltage.

For welding operations, switch blades 71 and 73 of switch S1 will be moved to their ON positions and switch blades 101 and 103 of switch S2 will remain in their OFF positions. In addition, welding cables will be coupled to plugs 41 and 43. In this condition, switch blade 71 will engage terminal 77 and connect the pilot light 123 and the relay coil 55 to the battery 33. The pilot light 123 will be energized as well as relay coil 55 the latter of which will open switch 53 to disconnect the output 31 from the battery 33. When switch blade 73 is moved from terminal 83 to terminal 79, the regulator 35 will be switched out of the circuit and the stator windings will be coupled to the rotor field coil 21 by way of lead 75, switch blade 73, lead 87, capacitor C1 and lead 85.

With the engine running, and with no welding taking place, there is no load at the output 31 and the rotor field coil 21 is excited by the battery 33 by way of lead 59, switch blade 71, and lead 85. Diode D2 prevents voltage or current from being applied to the regulator. A DC field is set up across the rotor coil 21 whereby a DC field is induced into the stator windings. Since there is no welding load applied to the output 31, no current flows in the stator circuit. Thus the voltage at point 131 from the stator windings is DC. This voltage charges capacitor C1 but is not applied back to the rotor field coil 21 since the capacitor C1 will not pass DC.

As soon as an arc is struck by the welder and a load is applied to the output 31, current flows in the stator circuit and pulses are generated (pulsating direct current waves or spikes) in the stator circuit. Thus a pulsating DC voltage is developed across the stator windings which is present at point 131. Since the capacitor C1 will pass a pulsating DC voltage this pulsating DC voltage is applied to the rotor coil 21 to excite the coil. This pulsating DC voltage is applied to the rotor coil 21 by way of lead 75, switch blade 73, lead 87, capacitor C1 and lead 85. The pulsating voltage passed by capacitor C1 exceeds the applied 12 volt DC voltage from battery 33 thereby reverse biasing diode D1 and blocking current flow from the battery 33 to the rotor field. Field excitation is applied from the battery through D1 at the time of complete discharge of C1 when its voltage falls below 12 volts. Thus a pulsating field is set up across the rotor coil 21 which appears in the stator windings as an additive or increased voltage and current resulting in an increased output at 31 which is pulsating DC. A pulsating DC output is desirable for welding purposes in order to obtain a welding arc. As the load increases, the current increases in the rotor circuit, thereby increasing the output of the stator circuit. A decrease in the load decreases the rotor current and reduces the output of the stator circuit. When the load is removed, the rotor coil 21 again becomes excited only by the battery 33. Thus the system is completely automatic and the output produced at 31 depends upon the load applied. The system has advantages over that disclosed in U.S. Pat. No. 3,770,976 in that there are fewer parts to create trouble; no mechanical switching since the system operates on demand; it can produce a higher power output; it can handle larger welding rod sizes; there is reduced phase shift between rotor and stator due to in phase syncronizing pulses; and it simplifies arc stabalization by its pulsating DC output resulting in ease of operation.

For power tool operations, switch blades 71 and 73 are maintained in the ON positions and switch blades 101 and 103 are moved to their ON positions. An electrical cable from the power tool has its prongs plugged into receptacle R1. When the power tool is turned on, the capacitors C2 and C3 act to increase the voltage at the output 31 and to filter the voltage to prevent a pulsating DC voltage from being applied to the power tool which may otherwise burn out the switch of the power tool. The capacitors C2 and C3 act as a voltage doubler and nearly double the voltage output at 31. Since the capacitors filter the AC component, a DC voltage is developed at point 131 which is not passed by the capacitor C1. Thus the rotor field is excited by the battery 31. The voltage developed at the output 31 will be DC. The power tools which can be operated off of the output 31 are of the type having a DC motor.

We claim:

1. A system coupled to a multi-phase rectified rotary field system to increase the power and current through feedback, said multi-phase system comprising a rotatable coil for forming said rotary field when excited, stationary windings, an output, and rectifier means coupled to said stationary windings and to said output, said system comprising:

diode means, a DC power supply for exciting said rotatable coil of said multi-phase system by way of said diode means, output means coupled to said output for applying current to a load, and capacitor means having one side coupled to said stationary windings and an opposite side coupled to said rotatable coil for applying a pulsating output from said stationary windings to said rotatable coil when the load draws current.

2. A system coupled to a multi-phase rectified rotary field system to increase the power and current through feedback, said multi-phase system comprising a rotatable coil for forming said rotary field when excited, stationary windings, an output, and rectifier means coupled to said stationary windings and to said output, said system comprising:

a DC power supply, circuit means including diode means coupled from said DC power supply to said rotatable coil for exciting said rotatable coil of said multi-phase system, output means coupled to said output for applying current to a load, and feedback circuitry comprising capacitor means coupled from said stator windings to said circuit means for applying a pulsating output from said stationary windings to said rotatable coil when the load draws current, said feedback circuitry being coupled to said circuit means between said diode means and said rotatable coil, said capacitor means having one side coupled to said stationary windings and an opposite side coupled to said rotatable coil.

3. A system coupled to a multi-phase rectified rotary field system to be used for welding application or power tool application, said multi-phase system comprising a rotatable coil for forming said rotary field when excited, stationary windings, an output, and rectifier means coupled to said stationary windings and to output, said system comprising:

a DC power supply, circuit means coupled from said DC power supply to said rotatable coil for normally exciting said rotatable coil of said multi-phase system, first output means coupled to said output for applying current to a welding load, second output means coupled to said output for applying a power tool load to said output, feedback circuitry comprising a feedback capacitor means coupled from said stationary windings to said circuit means, power tool capacitor means, and switch means for coupling said power tool capacitor means from ground to a position between said feedback capacitor means and said stationary windings when said second output means is used to apply a power tool load to said output, said switch means being capable of uncoupling said power tool capacitor means from ground to said position between said feedback capacitor means and said stationary windings, said feedback circuitry comprising said feedback capacitor means applying a pulsating output from said stationary windings to said rotatable coil when a welding load is applied to said output and when said switch means is in a condition to uncouple said power tool capacitor means from ground to said position between said feedback capacitor means and said stationary windings.

4. A system coupled to the electrical system of a motor vehicle having a DC power supply, a regulator, and an alternator-rectifier system, said alternator-rectifier system comprising a rotatable coil adapted to be driven by the vehicle engine, and stator windings having an output normally coupled to said DC power supply for normally charging said DC power supply, said regulator having an input coupled to said DC power supply, said stator windings normally being coupled to said regulator, and a field lead coupled from said regulator to said rotatable coil, said system comprising:

output means coupled to said output for applying a load to said output, a feedback lead comprising capacitor means coupled to said rotatable coil, a normally closed switch for normally connecting said output to said DC power supply, control means for controlling said normally closed switch, a main switch adapted to be placed in first or second conditions, said main switch normally coupling said stator windings to said regulator when in said first condition, said main switch when in said second condition
 (a) coupling said DC power supply to said control means for opening said normally closed switch,
 (b) coupling said DC power supply to said rotatable coil by way of a diode means,
 (c) uncoupling said stator windings from said regulator, and
 (d) coupling said stator windings to said feedback lead to apply a pulsating output by way of said capacitor means to said rotatable coil when a load is applied to said output.

5. A system coupled to the electrical system of a motor vehicle having a DC power supply, a regulator, and an alternator-rectifier system, said alternator-rectifier system comprising a rotatable coil adapted to be driven by the vehicle engine, and stator windings having an output normally coupled to said DC power supply for normally charging said DC power supply, said regulator having an input coupled to said DC power supply, said stator windings normally being coupled to said regulator, and a field lead coupled from said regulator to said rotatable coil, said system comprising:

first output means coupled to said output for applying current to a welding load, second output means coupled to said output for applying a power tool load to said output, a feedback lead comprising a feedback capacitor means coupled to said rotatable coil, a normally closed switch for normally connecting said output to said DC power supply, a solenoid coil for controlling said normally closed switch, a main switch adapted to be placed in first or second conditions, said main switch normally coupling said stator windings to said regulator when in said first condition, said main switch when in said second condition
 (a) coupling said DC power supply to said solenoid for opening said normally closed switch,
 (b) coupling said DC power supply to said rotatable coil by way of a diode,
 (c) uncoupling said stator windings from said regulator, and
 (d) coupling said stator windings to said feedback lead, power tool capacitor means, and power tool switch means for coupling said power tool capacitor means from ground to a position between said feedback capacitor means and said stationary windings when said second output means is used to apply a power tool load to said output, said power tool switch means being capable of uncoupling said power tool capacitor means from ground to said position between said feedback capacitor means and said stationary windings.

6. The system of claims 1 or 2, wherein:

when said pulsating output passed by said capacitor means is greater than the output from said DC power supply, said diode means becomes reversed biased, blocking current flow from said DC power supply to said rotatable coil.

7. The system of claim 3, wherein:

said circuit means includes a diode means.

8. A system coupled to a multi-phase rectified rotary field system to increase the power and current through feedback, said multi-phase system comprising a rotatable coil for forming said rotary field when excited, stationary windings, an output, and rectifier means coupled to said stationary windings and to said output, said system comprising:
- a DC power supply for exciting said rotatable coil of said multi-phase system,
- output means coupled to said output for applying current to a load,
- capacitor means having one side coupled to said stationary windings and an opposite side coupled to said rotatable coil for applying a pulsating output from said stationary windings to said rotatable coil when the load draws current, and
- means for preventing said DC power supply from exciting said rotatable coil when said pulsating output is greater than the output from said DC power supply.

9. A system coupled to a multi-phase rectified rotary field system to increase the power and current through feedback, said multi-phase system comprising a rotatable coil for forming said rotary field when excited, stationary windings, an output, and rectifier means coupled to said stationary windings and to said output, said system comprising:
- a DC power supply,
- circuit means coupled from said DC power supply to said rotatable coil for allowing said DC power supply to excite said rotatable coil of said multi-phase system,
- output means coupled to said output for applying current to a load,
- feedback circuitry comprising capacitor means coupled from said stator windings to said circuit means for applying a pulsating output from said stationary windings to said rotatable coil when the load draws current,
- said capacitor means having one side coupled to said stationary windings and an opposite side coupled to said rotatable coil, and
- means for preventing said DC power supply from exciting said rotatable coil when said pulsating output is greater than the output from said DC power supply.

* * * * *